Sept. 14, 1965   HANS-PETER ACKERMANN   3,205,899
APPARATUS FOR MAKING CIGAR FILLERS
Filed June 25, 1962                6 Sheets-Sheet 1

INVENTOR:
HANS-PETER ACKERMANN
BY Michael S. Striker
His ATTORNEY

Sept. 14, 1965  HANS-PETER ACKERMANN  3,205,899
APPARATUS FOR MAKING CIGAR FILLERS
Filed June 25, 1962  6 Sheets-Sheet 5

INVENTOR:
HANS-PETER ACKERMANN
BY Michael J. Striker
His ATTORNEY

Sept. 14, 1965    HANS-PETER ACKERMANN    3,205,899
APPARATUS FOR MAKING CIGAR FILLERS
Filed June 25, 1962    6 Sheets-Sheet 6

INVENTOR:
HANS-PETER ACKERMANN
BY Michael J. Striker
His ATTORNEY

United States Patent Office 3,205,899
Patented Sept. 14, 1965

1

3,205,899
APPARATUS FOR MAKING CIGAR FILLERS
Hans-Peter Ackermann, Hamburg-Bergedorf, Germany, assignor to Hauni-Werke Körber & Co. K.G., Hamburg-Bergedorf, Germany
Filed June 25, 1962, Ser. No. 204,690
Claims priority, application Germany, Dec. 3, 1959, H 38,055; June 24, 1961, H 42,948
31 Claims. (Cl. 131—23)

This is a continuation-in-part of my application Serial No. 73,380, filed December 2, 1960 and now abandoned.

The present invention relates to an apparatus for making cigar fillers. More particularly, the invention relates to an apparatus for continuously or intermittently producing cigar fillers and similar tobacco-containing products on a scale necessary to render the operation desirable for commercial use.

In the manufacture of cigars and similar tobacco-containing products, it was heretofore customary to form a continuous cigar filler rod and to cut from the filler rod individual sections or fillers of predetermined length. Such fillers have the same diameter from end to end and are sold on the market under the name of cigarillos or cheroots. Heretofore, cigars with conical end portions were produced by hand or in rudimentary machines so that the rate at which a filler rod is cut into sections is much higher than the rate at which such sections may be shaped into cigar fillers with a conical portion at one or both ends thereof. As far as I am informed at this time, cigar filler making machines do not operate at a speed higher than about 25 r.p.m. which is insufficient for a mass-manufacturing operation.

Accordingly, it is an important object of my invention to provide a novel apparatus for making fillers with reduced end portions wherein the end portions of the fillers may be reduced or molded at the same rate at which such fillers are formed by cutting up a continuous filler rod.

Another object of the invention is to provide an apparatus for making fillers with reduced end portions at a rate exceeding at least ten times the rate at which fillers are shaped in conventional machines of which I am aware at this time.

A further object of my invention is to provide an apparatus for the production of cigar or cigarillo fillers with reduced end portions in a mass-manufacturing operation.

An additional object of the invention is to provide an apparatus of the just outlined characteristics which can be rapidly and conveniently converted for processing of differently configurated and/or dimensioned cigar or cigarillo fillers and which can be utilized for reducing or molding one or both end portions of consecutive fillers.

A further object of the invention is to provide an apparatus for the production of cigar or cigarillo fillers which is constructed and assembled in such a way that the entire operation, starting with the forming of a continuous filler rod and terminating with the discharge of cigar or cigarillo fillers can be carried out without interruptions and without it being necessary to touch the tobacco, the filler rod or the fillers during any of the various stages of the operation.

A concomitant object of the invention is to provide an apparatus for the production and treatment of cigar or cigarillo fillers wherein the end portions of fillers are treated and shaped in such a way that the treatment to which the fillers are subjected does not undesirably affect the flow of smoke into a smoker's mouth.

An additional object of the invention is to provide an apparatus of the above outlined characteristics which can be utilized for treatment of single- or twin-length fillers.

2

In one of its preferred forms, the apparatus of my invention comprises a first rotary carrier which may be a revolving drum or an endless chain conveyer and which is provided with a plurality of filler-receiving holder means at least nearly parallel with the axis of rotation of the carrier, means for consecutively feeding fillers from a filler rod making device or from a magazine into the holder means of this carrier, a second rotary carrier having a plurality of filler-receiving holder means at least nearly parallel with the axis of the second carrier, means for rotating the carriers, means located downstream of the feeding means for consecutively transferring fillers from the holder means of the first carrier to the holder means of the second carrier, means comprising at least one milling tool for milling recesses in the end portions of fillers while the fillers are received in the holder means of the first carrier, and means for compressing and for thereby deforming the end portions of fillers while the fillers are received in the holder means of the second carrier so that the recesses formed by the milling tool or tools disappear and that the end portions of fillers assume a substantially conical shape.

The novel features which are considered as characteristic of the invention are set forth in particular in the appended claims. The improved apparatus itself, however, both as to its construction and its mode of operation, together with additional features and advantages thereof, will be best understood from the following detailed description of certain specific embodiments with reference to the accompanying drawings, in which:

FIG. 8a is a section as seen in the direction of arrows from the line VIIIa—VIIIa of FIG. 8;

Figure 1:
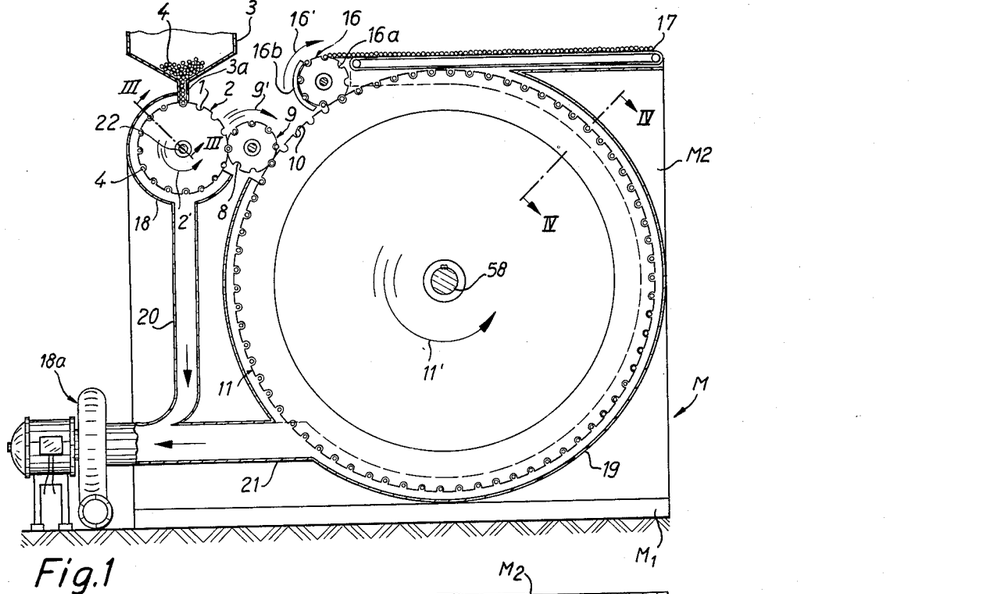
FIG. 1 is a schematic front elevational view of an apparatus for treating cigar fillers which embodies one form of my invention and which is utilized for treatment of twin fillers so that both end portions of each filler may be milled and thereupon molded in a single operation.
Figure 2:
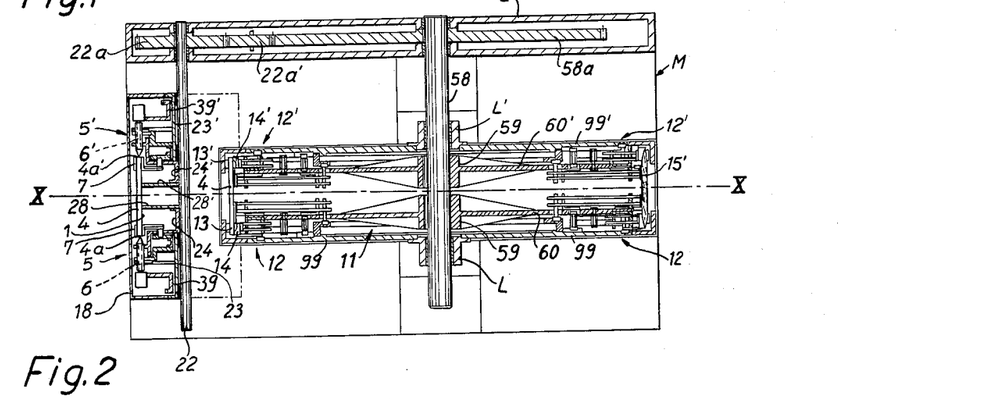
FIG. 2 is an axial section through a milling drum and through a molding drum which form part of the apparatus shown in FIG. 1, further showing a synchronizing gearing which couples the drive shafts of the drums.

Referring now in greater detail to illustrated embodiments, and first to FIGS. 1 and 2, there is shown one form of an apparatus which embodies my invention. This apparatus comprises a source of fillers 4 here shown as a magazine or hopper 3 which is provided with a feeding means in the form of a spout 3a adapted to consecutively discharge fillers by gravity feed so that the fillers are received in peripheral holding means 1 provided on a rotary drum-shaped carrier 2, hereinafter called drilling or milling drum. The holders 1 comprise pairwise arranged aligned pockets 1 which are parallel with the axis of a drive shaft 22, the latter serving as a means for driving the milling drum 2 in an anticlockwise direction, as viewed in FIG. 1. The shaft 22 carries a pinion 22a which drives a gear 22a' meshing with a gear 58a provided on a second drive shaft 58 serving as a means for driving a second rotary carrier 11, hereinafter called molding drum. The means for driving the gear 58a may include a suitable electric motor and a gear reducer (not shown) whose construction forms no part of this invention. The gear 58a and the pinion 22a synchronize rotary movements of the milling drum 2 with rotary movements of the molding drum 11 so that a rotary transfer drum 9, provided between the drums 2 and 11, may consecutively transfer fillers 4 from the pockets 1 into pairwise arranged holding means or pockets 10 provided along the periphery of the drum 11. It will be noted that the transfer drum 9 is formed with peripheral pockets 8 and that this drum is located downstream of the feeding means 3a, as viewed in the direction in which the drum 2 rotates.

After completing less than one full revolution about the axis of the drive shaft 58, the fillers contained in the pockets 10 are transferred into peripheral pockets 16a of a second rotary transfer drum 16 which is located downstream of the first transfer drum 9 and which delivers fillers onto the upper run of an endless belt or chain conveyer 17 so that this conveyer may advance the fillers to a further processing station, not shown. The directions in which the drums 2, 9, 11 and 16 rotate are respectively indicated by arrows 2', 9', 11' and 16'.

Referring to FIG. 2, it will be noted that the milling drum 2 supports a series of pairwise arranged drilling or milling units 5, 5' and that one pair of such units is provided for each pair of aligned pockets 1. Analogously, the molding drum 11 supports a plurality of pairwise arranged molding or compressing units 12, 12', one pair for each pair of pockets 10.

The milling drum 2 is partially surrounded by a casing 18 which is provided with an evacuating duct 20 leading to a means 18a for creating partial vacuum so that any tobacco particles or other impurities may be withdrawn from the casing 18. A similar casing 19 surrounds a portion of the molding drum 11, and this casing is also provided with an evacuating duct 21 which is connected to the aforementioned partial vacuum creating means 18a in order to remove from the casing 19 any impurities which accumulate when the fillers 4 are being treated while resting in the pockets 10. In other words, the internal spaces of the casing 18, 19 are maintained at subatmospheric pressure. The casing 19 has been omitted in FIG. 2 for the sake of clarity. This illustration shows that the drive shafts 22, 58 are mounted in a machine frame M including a base M₁ and a hollow bearing member M₂ which accommodates the synchronizing gearing 22a, 58a.

Figure 3:
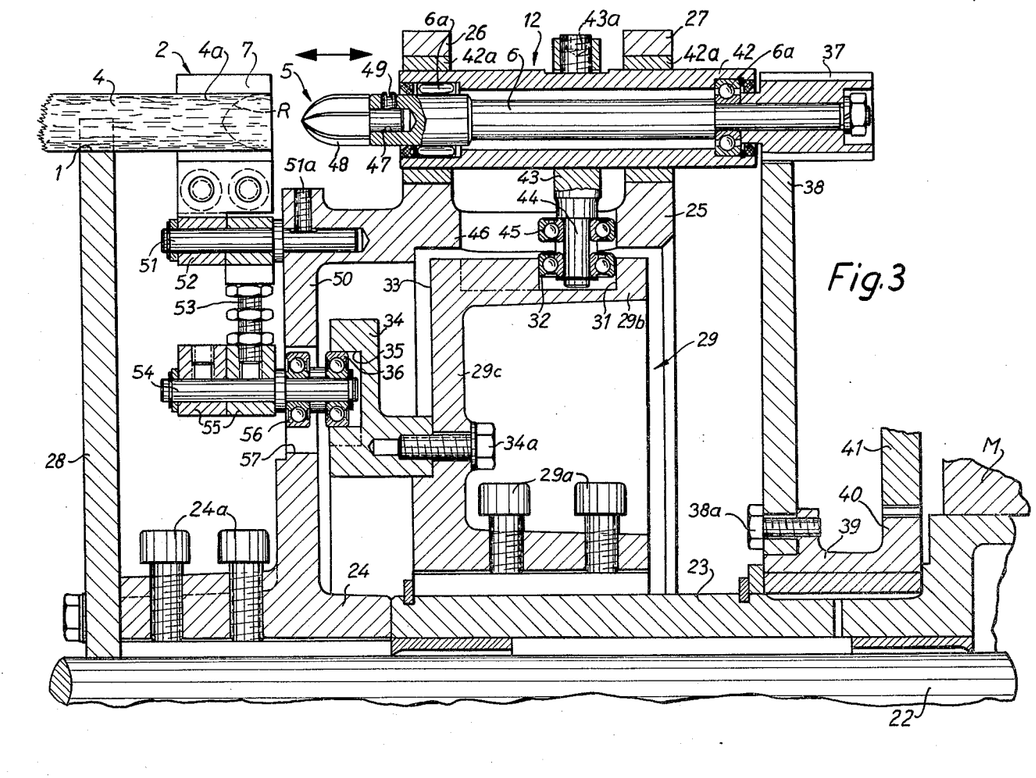
FIG. 3 is a greatly enlarged fragmentary section through the milling drum as seen in the direction of arrows from the line III—III of FIG. 1.

Since the milling units 5, 5' are of identical construction and since these units are arranged symmetrically with respect to a symmetry plane X—X (see FIG. 2) which passes through the centers of the drums 2, 11 and which is perpendicular to the axes of the drive shafts 22, 58, FIG. 3 illustrates only one milling unit 5 and a portion of the drum 2 sufficient for full understanding of the invention. The drum 2 comprises two each of the component parts shown in FIG. 3, and such component parts are arranged mirror symmetrically with respect to the plane X—X which is located at the left-hand side of FIG. 3.

The structure shown in FIG. 3 comprises a stationary bearing sleeve 23 which is mounted on the drive shaft 22. A hub section 24 is adjacent to the left-hand end of the bearing sleeve 23 and is secured to the shaft 22 by bolts 24a so that the hub section 24 and the shaft 22 rotate in unison. The hub section 24 is cupped and comprises a tubular flange 25 which extends axially in a direction toward the nearest end face of the drum 2 (that is, toward the lower end face of this drum, as viewed in FIG. 2), and the flange 25 carries a pair of spaced radially outwardly extending disk-shaped collars 26, 27 which are disposed in planes perpendicular to the axis of the drive shaft 22. At that axial end thereof which extends toward the symmetry plane X—X, the hub section 24 carries a disk-shaped element 28 whose periphery is provided with equidistant pockets 1.

The bearing sleeve 23 is surrounded by a stationary supporting member 29, hereinafter called cup, whose hub is secured to the bearing sleeve by bolts 29a. A concentric cylindrical flange 29b of the cup 29 is received with play in the flange 25 and constitutes a so-called cylinder cam whose peripheral cam groove 31 is tracked by a roller follower 32. This follower is mounted on the stud 44 of a follower support 43 which is rigidly fixed to an axially reciprocable cylindrical sleeve or shell 42 by means of one or more stud screws 43a. The shell 42 forms part of the milling unit 5 and is reciprocable in bushings 42a provided in the collars 26, 27, and its axis is parallel with the axis of the drive shaft 22. Since the collars 26, 27 form part of the hub section 24, and since the hub section 24 rotates with the shaft 22, the follower 32 is compelled to travel about the fixed cylinder cam 29b and thereby tracks the walls of the groove 31 so as to reciprocate the shell 42 in the bushings 42a.

The radially extending wall 29c of the cup 29 has an inner face 33 which is turned toward the element 28, and this wall carries an annular face cam 34 secured thereto by bolts 34a. The left-hand face of the cam 34 is formed with a cam groove 35 for a roller follower 36 which is mounted on a pin 54. This pin is compelled to rotate with the hub section 24 so that the follower 36 moves radially toward and away from the axis of the drive shaft 22 when the hub section 24 rotates. The purpose of the face cam 34 and of the roller follower 36 is to actuate a pair of clamping elements or claws 7 one of which is fully shown in FIG. 3 and whose function is to clamp the right-hand end portion 4a of a filler 4 which is accommodated in the pocket 1 so that the filler is in requisite position to be engaged by a suitably configured milling tool 48. This tool comprises a coaxial extension which is received in a blind bore 47 provided in the left-hand end face of a spindle 6, the latter forming part of the milling unit 5 and rotatably mounted in suitable thrust bearings 6a provided in the shell 42. The spindle 6 shares all axial movements of the shell 42 but is rotatable with respect thereto. The connection between the spindle 6 and the milling tool 48 comprises a radial screw 49.

The right-hand end portion of the spindle 6 is rigidly secured to a pinion 37 of considerable axial length, and this pinion meshes with a gear 38 which is secured to a hub 39 by bolts 38a. The hub 39 is rotatable about the bearing sleeve 23 and comprises a pinion 40 meshing with a gear 41 which is driven by a suitable motor (not shown) through a reducing gearing or the like so that the gear 38 may drive the pinion 37 and the spindle 6. The gear 38 constitutes a sun wheel and the pinion 37 constitutes a planet wheel which is driven by and which simultaneously orbits about the sun wheel. In other words, the gear train 37, 38, 40, 41 forms a planetary gear transmission which serves as a means for rotating the milling tool 48. The arrangement is preferably such that the means which rotates the gear 41 may drive the tool 48 at variable speed.

The milling drum 2 further comprises means for retaining the roller follower 32 in the groove 31 of the cylinder cam 29b. This retaining means comprises a roller 45 which is mounted on the stud 44 of the follower support 43 and which is received in an elongated guide slot 46 provided in the flange 25. The slot 46 extends in the axial direction of the milling drum 2 and its length is sufficient to insure that the follower 32 may properly track the walls bounding the cam groove 31 in order to reciprocate the shell 42 and the milling tool 48. The width of the slot 46 is only slightly greater than the diameter of the roller 45. Consequently, the axis of the stud 44 is always radial with respect to the drive shaft 22.

The hub section 24 comprises a radially outwardly extending disk-shaped web 50 which carries the flange 25 and which also supports a pivot pin 51 for the clamping elements 7. The pin 51 is secured to the hub section 24 by a radially extending screw 51a. The clamping elements 7 are provided at the outer ends of two-armed levers 52 which are rockable about the pin 51 and which are similar to the levers 63, 64 shown in FIGS. 4 and 5. The inner arms of the levers 52 comprise mutually inclined length-adjusting bolts 53 whose inner ends are screwed into sockets 55 turnably mounted on the aforementioned pin 54. When the face cam 34 causes the roller follower 36 to move radially inwardly (i.e., downwardly, as viewed in FIG. 3), the sockets 55 cause the levers 52 to pivot about the pin 51 and to move the clamping elements 7 toward each other so that these clamping elements engage the end portion 4a of the filler 4.

The means for retaining the roller follower 36 in the cam groove 35 comprises a roller 56 which is mounted on the pin 54 and which is reciprocable in a radially extending guide slot 57 provided in the web 50 of the hub section 24. The retaining means 56, 57 insures that the axes of the pins 51, 54 remain coplanar with the axis of the drive shaft 22.

The length-adjusting bolts 53 enable an operator to regulate the extent to which the clamping elements 7 may move toward or away from each other and to thereby adjust these elements for use in connection with different types of fillers.

The configuration of the cam grooves 31, 35 is selected in such a way that rocking movements performed by the clamping elements 7 are properly synchronized with axial movements of the milling tool 48 toward and away from the end portion 4a of that filler 4 which is supported in aligned pockets 1 of the disk-shaped element 28 and of the mirror-symmetrically arranged second disk-shaped element 28' (see FIG. 2). The filler 4 is assumed to be a twin-length filler which, after passing through the apparatus of FIGS. 1 and 2, may be cut in half to form two cigars or cigarillos. As shown in FIG. 3, the milling tool 48 is adapted to form in the right-hand face of the filler 4 a substantially conical recess R which enables a molding unit 12 or 12' to impart to the recessed end portion 4a of the filler a characteristic substantially conical shape while the filler travels about the axis of the drive shaft 58 and is received in one pair of pockets 10.

As a rule, the milling tool 48 is rotated at constant speed. However, it might become necessary to rotate the spindle 6 of the milling unit 5 at a different speed if the tool 48 is replaced by a different milling tool which is used with fillers of larger or smaller diameter, as the case may be.

In the event that the apparatus of my invention is to be used with fillers of different length, the drum 2 may be rapidly and conveniently converted for such operation because the hub section 24, the disk-shaped element 28 and the bearing sleeve 23 are adjustable in the axial direction of the drive shaft 22. In addition, the bolts 29a enable an operator to adjust the axial position of the cup 29 if desired.

The construction of the other half of the drum 2 is identical with that shown in FIG. 3, and certain component parts of this drum are identified in FIG. 2 by the same reference numerals as utilized in FIG. 3, each followed by a prime. Thus, FIG. 2 shows a second hub 39', a second spindle 6' forming part of that milling unit 5' which is aligned with the milling unit 5 of FIG. 3, a second hub section 24', and a second disk-shaped element 28'. Axial adjustments of the second hub section 24', of the element 28' and of the second bearing sleeve 23' may be carried out in the same manner as described in connection with FIG. 3. The milling units 5, 5' are axially adjustable with the parts 24, 28 and 24', 28', respectively.

Figures 4, 5:
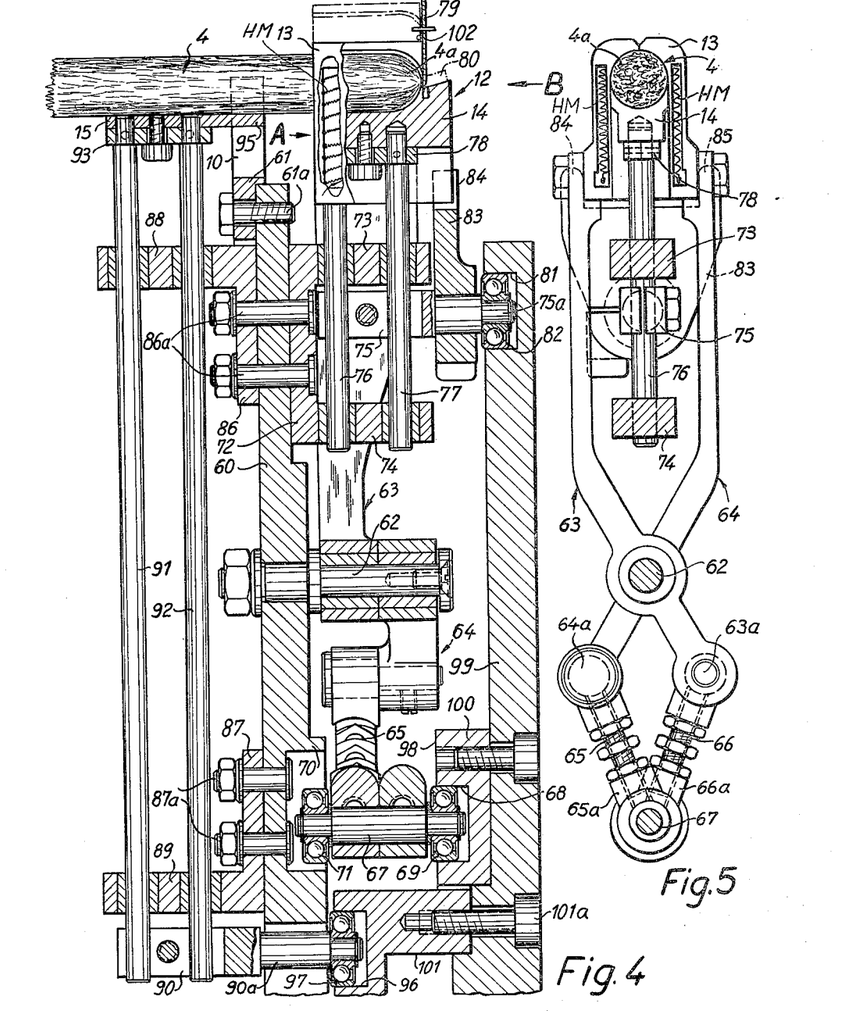
FIG. 4 is a greatly enlarged fragmentary section through the molding drum as seen in the direction of arrows from the line IV—IV of FIG. 1.
FIG. 5 is a rear end view of a molding unit as seen in the direction of arrow A in FIG. 4.

FIG. 4 illustrates a portion of the molding drum 11, i.e., that portion which forms part of the lower part of this drum and which is located below the plane X—X shown in FIG. 2. FIG. 4 also shows in greater detail one of the molding units 12 which is supported by the drum 11 and whose construction will be more readily understood by simultaneous reference to FIG. 5.

The structure shown in FIG. 4 comprises a disk-shaped element 60 (hereinafter called disk) which is disposed in a plane perpendicular to the axis of the drive shaft 58. One set of pockets 10 is provided in an annulus 61 which is secured (see the bolts 61a) to the peripheral portion or which forms an integral part of the disk 60. As illustrated in FIG. 2, the disk 60 comprises a hub 59 which is fixed to and which rotates with the drive shaft 58. The hub 59 may be adjusted in the axial direction of the shaft 58 in the same way as described in connection with the hub section 24 and shaft 22. When an operator desires to adjust the axial position of the disk 60 and of the annulus 61, he shifts a bearing sleeve L which is outwardly adjacent thereto and which is provided with a bushing for the shaft 58. The bearing sleeve L does not rotate with the shaft 58.

Referring again to FIGS. 4 and 5, the disk 60 carries a pin 62 for a pair of rockable two-armed levers 63, 64 which form part of the molding unit 12 and each of which comprises a radially outwardly extending longer arm provided with a detachable molding element or outer jaw 13, and a radially inwardly extending shorter arm. These shorter arms of the levers 63, 64 are respectively connected with length-adjusting bolts 66, 65 whose sockets 66a, 65a are turnable about the axis of a pin 67. The connection between the bolt 65 and the lever 64 comprises a pivot pin 64a, and a similar pin 63a provides a pivotal connection between the bolt 66 and the shorter arm of the lever 63.

The means for rocking the levers 63, 64 so as to move the jaws 13 substantially tangentially of the drum 11 toward or away from each other comprises an annular face cam 100 which is secured to a disk-shaped end wall 99 and whose inwardly turned face 98 is provided with an endless cam groove 68 bounded by walls tracked by a roller follower 69 which is mounted on the pin 67. The means for retaining the axes of the pins 62, 67 in a common plane with the axis of the drive shaft 58 (i.e., for preventing the entire milling unit 12 from becoming tilted about the axis of the pin 62) comprises a roller 71 which is mounted on the pin 67 and which is reciprocable in a radially extending elongated guide slot 70 provided in the right-hand face of the disk 60, as viewed in FIG. 4.

The disk 60 further supports a substantially U-shaped bracket 72 whose legs 73, 74 extend between the longer arms of the levers 63, 64 to support a pair of motion transmitting parallel rods 76, 77 in such a way that these rods are free to reciprocate radially inwardly and outwardly with respect to the axis of the drive shaft 58. The rods 76, 77 are fixed to a crosshead 75 which is located between the legs 73, 74. The outer ends of the rods 76, 77 are detachably secured to a supporting plate 78 for a third molding element or intermediate jaw 14 which is reciprocable radially inwardly and outwardly and which cooperates with the outer jaws 13 to mold the end portion 4a of a filler 4 in a manner to be described in connection with FIGS. 6 to 9a. FIGS. 4 and 5 illustrate the molding unit 12 in a position its jaws 13, 14 assume just after completion of a molding operation, and FIG. 4 further shows a portion of a cutting means in the form of a rotary disc cutter 79 which is about to separate from the molded end portion 4a a compacted rod-shaped batch 80 of excess tobacco (shown in phantom lines).

The means for reciprocating the crosshead 75 and the jaw 14 comprises a follower roller 82 which is mounted on a stud 75a secured to or forming part of the crosshead 75 and which tracks the walls bounding an endless cam groove 81 provided in the left-hand face of the aforementioned end wall 99. It is to be noted that the end wall 99 is secured to the bearing sleeve L and that it does not rotate with the drive shaft 58. The stud 75a carries a fishplate 83 provided with two spaced radially outwardly extending fingers 84, 85 (see FIG. 5) which move into abutment with the outer sides of the respective outer jaws 13 when the follower 82 compels the crosshead to move radially outwardly and to move the intermediate jaw 14 into engagement with the end portion 4a of the filler 4. The configuration of the cam grooves 68, 81 is such that the outer jaws 13 move into engagement with the end portion 4a before the crosshead 75 entrains the fishplate 83 in order to move the fingers 84, 85 into abutment with the respective jaws 13.

The left-hand face of the disk 60 (i.e., that face which is turned away from the molding unit 12) supports a pair of spaced substantially L-shaped brackets including an outer bracket 86 and an inner bracket 87. The bracket 86 is secured to the disk 60 by bolts 86a which also serve as a means for connecting the disk 60 with the bracket 72. The means for connecting the inner bracket 87 to the disk 60 comprises a series of bolts 87a. The brackets 86, 87 are respectively provided with legs 88, 89 which extend in a direction away from the disk 60 and which comprise bushings for a pair of parallel rods 91, 92 whose axes are perpendicular to and which extend radially outwardly from the axis of the drive shaft 58. The rods 91, 92 are reciprocable in the legs 88, 89 and are rigidly fixed to a crosshead 90 which is inwardly adjacent to the leg 89. The crosshead 90 is similar to the crosshead 75 and is provided with a stud 90a for a roller follower 97 which is received in an endless cam groove 96 provided in the left-hand face of a face cam 101 fixed to the end wall 99 by bolts 101a.

The outer ends of the rods 91, 92 are detachably connected with a plate 93 which carries a block 15 serving as a means for actually supporting the filler 4. The block 15 comprises an extension 95 which projects into the aligned pocket 10 of the annulus 61. Thus, the walls bounding the pockets 10 merely retain the filters in parallelism with the shaft 58, but the fillers rest on the blocks 15. The purpose of the rods 91, 92, of the block 15, of the crosshead 90, of the follower 97 and of the face cam 101 is to reciprocate the filler 4 radially toward and away from the shaft 58 in synchronism with movements of the jaws 13, 14. It will be noted that the cam 101 is secured to the stationary end wall 99 and that each of the endless cam grooves 68, 81, 96 is disposed in a plane which is perpendicular to the axis of the drive shaft 58 so that the followers 69, 82, 97 are caused to reciprocate radially inwardly and outwardly when the disk 60 rotates.

FIG. 5 shows that the intermediate jaw 14 is reciprocable radially toward and away from the drive shaft 58 (which latter is assumed to be located at a level below the pin 67), and that the outer jaws 13 are reciprocable toward and away from the common plane of the pins 62, 67 and of the rods 76, 77, 91, 92, i.e., substantially tangentially with respect to the drum 11. The jaws 13 are provided with electric heating means HM.

Figure 6:
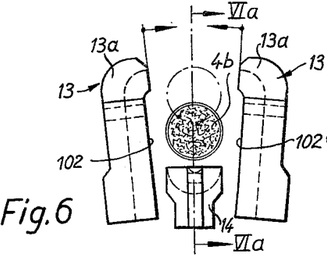
FIG. 6 is a front end view of three jaws which form part of the molding unit shown in FIGS. 4 and 5, these jaws being shown in positions they assume when a molding operation is started and the view of FIG. 6 being taken in the direction of arrow B shown in FIG. 4.
Figure 6A:
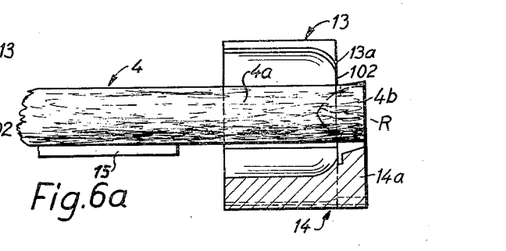
FIG. 6a is a section as seen in the direction of arrows from the line VIa—VIa of FIG. 6.
Figure 7:
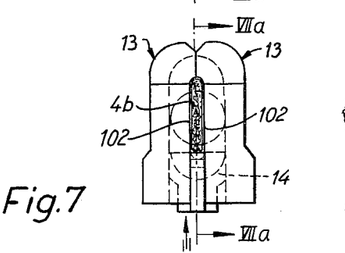
FIG. 7 is another front end view of the jaws which are shown in positions they assume during an initial stage of a molding operation when the mirror symmetrically arranged outer jaws are moved into engagement with the end portion of a filler.
Figure 7A:
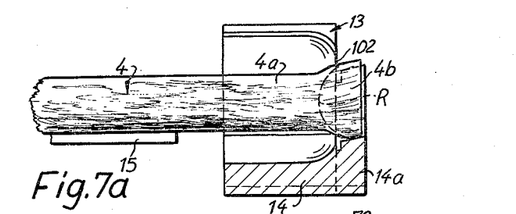
FIG. 7a is a section as seen in the direction of arrows from the line VIIa—VIIa of FIG. 7.

FIGS. 6 and 6a illustrate the jaws 13, 14 in a position they assume just before a molding operation begins. The follower 97 has moved the block 15 (see also FIG. 4) radially inwardly, the follower 69 has caused the outer jaws 13 to move away from each other, and the follower 82 has moved the intermediate jaw 14 radially inwardly, that is, toward the axis of the drum 11. The molding unit 12 is positioned in such a way that the tip 4b of the end portion 4a of the filler 4 extends beyond the right-hand faces 13a of the outer jaws 13, as viewed in FIG. 6a. These jaws are formed with premolding edge faces 102 which, when the jaws 13 assume the positions of FIGS. 7 and 7a, compress the tip 4b and impart to the latter the shape of a flattened body located in a plane coinciding with the plane of FIG. 4. Of course, it is to be understood that, since the filler 4 of FIGS. 6 to 9a was transferred from the milling drum 2, its tip 4b is already formed with a recess R which enables the jaws 13, 14 to impart to the end portion 4a its characteristic substantially conical shape. In the position of FIGS. 7 and 7a, the intermediate jaw 14 still remains spaced from the tip 4b even though the outer jaws 13 are already moved into engagement with the filler.

Figure 8:
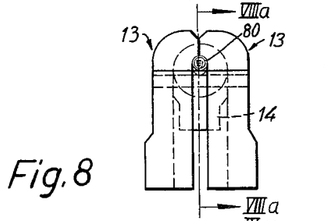
FIG. 8 is a further front end view of the jaws which are shown in positions they assume during a later stage of the molding operation when each of these jaws is in full compressing or molding engagement with the filler.

In the next stage of the molding operation which is illustrated in FIGS. 8 and 8a, the follower 97 has moved the block 15 radially outwardly so that the filler portion 4a is pressed against the concave inner sides of the outer jaws 13. Simultaneously with such radially outwardly directed movement of the block 15, the follower 82 causes the intermediate jaw 14 to move in the same direction whereby a projecting portion 14a of this jaw deforms the flattened tip 4b in cooperation with adjacent portions 102 of the jaws 13 so that the originally annular (FIGS. 6, 6a) and thereupon flattened (FIGS. 7, 7a) tip 4b is transformed into a compacted rod-shaped batch 80 which is separated from the end portion 4a by the aforementioned disc cutter 79. The edge faces 102 of the jaws 13 and the portion 14a of the jaw 14 define between themselves a first mold cavity for the batch 80. The disc cutter 79 is adjacent to the path of the molding unit 12 and is rotated in any suitable way so as to automatically separate the batch 80 when the molding unit 12 passes by. It will be noted that, when they assume the positions of FIGS. 8 and 8a, the jaws 13, 14 define between themselves a substantially conical second mold cavity 103 whose configuration corresponds to that of the end portion 4a and which tapers outwardly in a direction toward the mold cavity defined by the edge faces 102 and jaw portion 14a.

Figure 9:
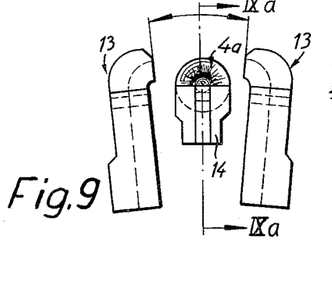
FIG. 9 is another front end view of the jaws which are shown in positions they assume upon completion of a molding operation.
Figure 9A:
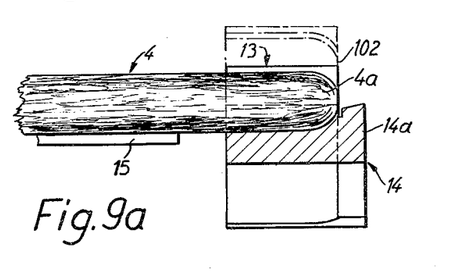
FIG. 9a is a section as seen in the direction of arrows from the line IXa—IXa of FIG. 9.

FIGS. 9 and 9a illustrate the last stage of a molding operation when the outer jaws 13 are moved away from each other and when the filler 4 is ready for transfer onto the conveyors 16 and 17.

Referring again to FIG. 2, it will be noted that the construction of the molding drum 11 is symmetrical with respect to the plane X—X. Thus, each molding unit 12 is aligned with a molding unit 12', a second disk-shaped element 60' with peripheral pockets 10 is arranged in mirror symmetry with the disk 60, a second end wall 99' and a second bearing sleeve L' are arranged in mirror symmetry with the end wall 99 and bearing sleeve L, and so forth. All parts of the drum 11 which are located at the upper side of the plane X—X, as viewed in FIG. 2, are identified by reference numerals utilized in FIGS. 4 and 5, each followed by a prime. The hub 59' of the element 60' and the bearing sleeve L' are axially adjustable along the drive shaft 58 in the same way as described in connection with FIGS. 4 and 5 so as to enable an operator to convert the molding drum 11 for use with fillers of different length. Furthermore, FIGS. 4 and 5 show that the outer jaws 13 are detachably secured to the levers 63, 64 and that the intermediate jaw 14 is detachable from the rods 76, 77 so that these jaws may be replaced by different jaws if the apparatus of FIGS. 1 and 2 is used in connection with fillers whose diameters are different from the diameter of the filler 4 shown in FIGS. 4 and 5. The molding units 12, 12' are axially adjustable with the elements 60, 60', respectively.

I will now proceed to describe the operation of the apparatus shown in FIGS. 1 and 2 in connection with a single filler 4 since each filler is treated in the same way. Furthermore, it is sufficient to describe the formation of a recess R in one end portion 4a of a filler 4 and subsequent molding of this end portion because the action of a milling unit 5' and of a molding unit 12' upon the other end portion 4a' (see FIG. 2) of the same filler 4 is identical.

As explained hereinabove, the fillers 4 contained in the hopper 3 are of twin length, and the spout 3a of this hopper feeds such twin-length fillers into consecutive pairwise arranged pockets or holding means 1 of the milling drum 2 which rotates in the direction indicated by the arrow 2'. It is assumed that the shaft 22 drives the drum 2 at constant speed and without interruptions. As a filler 4 travels about the axis of the drive shaft 22, its end portion 4a is engaged by the clamping elements 7 in a manner as shown in FIG. 3 and, during the next stage of rotary movement of this filler with the drum 2, the associated milling tool 48 is caused to form the recess R whereupon the follower 32 withdraws the tool 48 to the position of FIG. 3 and the follower 36 causes the clamping elements 7 to move away from the recessed end portion 4a. Tobacco particles removed by the milling tool 48 from the end portion 4a are evacuated through the duct 20 under the action of the vacuum creating means 18a.

The filler 4 now reaches the transfer station between the drums 2 and 9 and is transferred into one of the pockets 8, for example, by suction in a manner well known in the art of manufacturing tobacco-containing products. The drum 9 transfers the filler 4 into a pair of pockets or holding means 10 provided in the molding drum 11 so that the filler comes to rest on a pair of aligned block 15, 15'. Of course, since the drum 2 is driven at constant speed, the synchronizing gearing 22a, 58a compels the drum 11 to rotate at constant speed so that the peripheral speed of the drum 11 is identical with the peripheral speed of the drum 2. It will be noted that the diameter of the molding drum 11 is much greater than the diameter of the milling drum 2. This is due to the fact that it is normally desirable to maintain the recessed end portion 4a in longer-lasting engagement with the jaws 13, 14 in order to make sure that this end portion will retain its deformed shape, i.e., that the deformation of the end portion 4a is permanent rather than elastic. The batches 80 removed by the cutter 79 are sucked into the duct 21 together with any other impurities which might enter the casing 19.

Another reason for utilizing a large-diameter molding drum 11 will be explained in more detail in connection with the description of another embodiment of my invention according to which the end portions 4a are wetted prior to the actual molding step and such wetted end portions are thereupon heated and dried after the molding step is completed. It will be readily understood that, in order that the wetting and drying steps can be effective, the fillers supported on the molding drum should travel along a path whose length is sufficient to insure that all end portions 4a are sufficiently dry before reaching the transfer drum 16. In other words, the length of the path along which the fillers 4 travel between the transfer drums 9, 16 is greater than the length of the path along which the fillers travel between the feeding means 3a and the transfer drum 9.

The molding operation was described hereinabove in connection with FIGS. 6 to 9a. Thus, a filler 4 is transferred onto a pair of blocks 15, 15' when the jaws 13, 14 assume positions shown in FIGS. 6 and 6a. The outer jaws 13 then subject the end portion 4a to a preliminary compression to transform the tip 4b into a flat body (FIGS. 7 and 7a) and, in the next step which is shown in FIGS. 8 and 8a, the intermediate jaw 14 moves radially outwardly to cooperate with the jaws 13 so as to form the batch 80 which is separated from the molded end portion by the cutter 79. When the outer jaws 13 assume the positions shown in FIGS. 9 and 9a, the filler 4 may be transferred into the pockets 16a of the drum 16 (as soon as the jaw 14 and the block 15 return to the positions shown in FIG. 6) and thence onto the upper run of the belt 17. When a filler 4 reaches the drum 16, it is received in the inner zones of the pockets 10. As explained hereinabove, the jaws 13, 14 together form a composite mold whose mold cavity imparts to the end portion 4a a form as shown in FIG. 9a. The structure shown in FIGS. 9 and 9a differentiates from the structure of FIGS. 4 and 5 insofar as it is assumed that the fishplate 83 is omitted so that the outer jaws 13 may be moved apart before the intermediate jaw 14 moves away from the end portion 4a, i.e., the intermediate jaw 14 actually assists the block 15 in properly supporting a molded filler on its way toward the drum 16.

The configuration of the cam grooves 68 and 81 is preferably such that the jaws 13, 14 remain in positions shown in FIGS. 8 and 8a during the major part of the interval necessary for moving a filler from the first transfer drum 9 to the second transfer drum 16. This insures that the deformation imparted to the end portion 4a is permanent. During transfer of a filler into one of the pockets 16a, the respective intermediate jaw 14 and the respective block 15 assume the positions shown in FIG. 6 so that the molding unit 12 is ready for the next operation at the time or even before it reaches the transfer drum 9. Of course, at least some portions of the drums 2, 9, 11, 16 are surrounded by suitable retaining shields which retain the fillers in their respective pockets. Such shields are well known in the art of manufacturing cigarettes, cigars and other tobacco-containing products. FIG. 1 shows a shield 16b which is adjacent to the periphery of the transfer drum 16 and which retains the fillers in the pockets 16a during the transfer onto the conveyer 17. Similar shields are provided along such zones of the milling drum 2 in which the clamping elements 7 do not engage the end portions of the respective fillers and along such zones of the drum 11 in which the fillers supported on the blocks 15, 15' and/or in the pockets 10 are not engaged by the jaws 13 of the respective molding units. Additional shields are provided about the transfer drum 9 if this drum is driven at such speed that the fillers are likely to be ejected from pockets 8 by centrifugal force.

The arrangement of shields is such that the supporting or retaining action of shields associated with the transfer drum 9 begins at the very point where the shields associated with the milling drum 2 become ineffective and so on so that the fillers are maintained in a predetermined path consisting of several arcuate sections all the way from the feeding means 3a and to the take-off conveyer 17.

Figure 10:
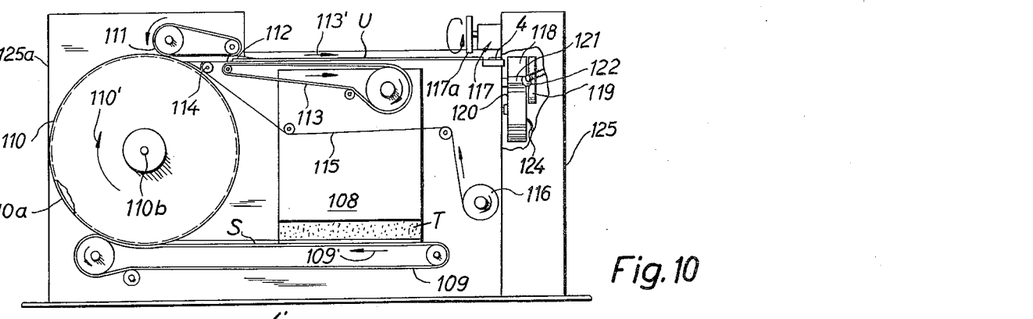
FIG. 10 is a diagrammatic side elevational view of a modified apparatus for making and for thereupon treating cigar or cigarillo fillers in such a way that only one end portion of each filler assumes a substantially conical shape.
Figure 11:
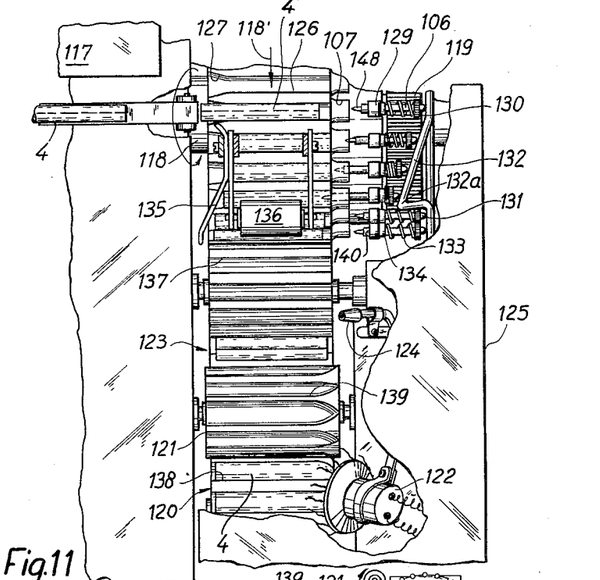
FIG. 11 is a fragmentary top plan view of the structure shown in the right-hand portion of the apparatus shown in FIG. 10.
Figure 12:
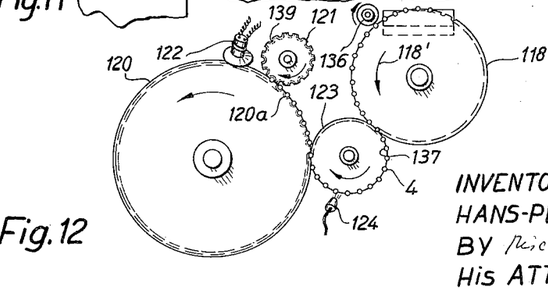
FIG. 12 is a diagrammatic side elevational view of certain parts of the structure shown in FIG. 11.

FIGS. 10 to 12 illustrate a modified apparatus which is adapted to form a recess in one end face of each filler. This apparatus comprises a means for continuously forming an elongated filler rod U including a source of tobacco here shown as a distributor 108 which showers tobacco T onto the horizontal upper run of an endless band conveyer 109, and this conveyer advances a stream S of tobacco (see the arrow 109') into a circumferential groove 110a provided in a conveying disk 110 which is mounted in a vertical plane and which is driven by a horizontal shaft 110b so as to rotate in a direction indicated by the arrow 110'. Adjacent to the uppermost point of the groove 110a, the stream S is engaged by an endless conveyer 111, also called inlet finger device, and is thereupon introduced into a forming finger 112 which is a horizontal tube and which is mounted above the upper run of a feeding means here shown as an endless forming band 113. This upper run of the band 113 carries a wrapping strip 115 which is paid out by a spool 116 and which is trained around a deflecting roller 114. The upper run of the band 113 advances toward a cutting or subdividing device 117 (arrow 113') which includes a rotary wheel provided with one or more cutters 117a and which is driven in synchronism with the band 113 so that its cutter or cutters subdivide a continuously formed elongated filler rod U into fillers 4 of desired length. The means 108–116 for continuously forming the filler rod U is mounted on a frame member 125a.

Located past the cutting device 117, as viewed in the direction in which the filler rod U is advanced by the band 113, there is provided a first carrier in the form of a rotary drum 118 (hereinafter called milling drum). This milling drum is located between the cutting device 117 and a stationary gear 119 which latter is coaxial with the drum 118 and which performs the function of the gear train 38, 40, 41 shown in FIG. 3.

The apparatus of FIGS. 10 to 12 further comprises a second carrier in the form of a molding drum 120 whose diameter is greater than the diameter of the milling drum 118 and which may receive recessed fillers 4 through the intermediary of a transfer drum 123. The molding drum 120 cooperates with a counter pressing roller or drum 121 and with a heating means 122, e.g., an infrared heater or the like. A spray nozzle 124 is adjacent to the periphery of the transfer drum 123 to serve as a means for wetting recessed end portions of fillers 4 while the fillers advance from peripheral holders or pockets 126 of the milling drum 118 into peripheral pockets or holders 138 on the molding drum 120. The drums 118, 120, 121, 123, the gear 119, the wetting means 124 and the heating means 122 are accommodated in a suitable casing 125 whose internal space may be maintained at subatmospheric pressure in the same way as described in connection with FIG. 1.

FIG. 11 illustrates the details of the drums. As shown, the intake ends 127 of the pockets 126 are enlarged by flaring outwardly toward the cutting device 117. The right-hand or discharge ends of these pockets are adjacent to sleeve-like combination clamping and guide means 107 which correspond to clamping elements 7 on the milling drum 2 of FIG. 3. The sleeves 107 are fixed to and rotate with the milling drum 118. Each sleeve 107 is associated with a coaxially aligned milling tool 148. These milling tools are supported by axially reciprocable spindles 106 which are rotatable in bushings 129 fixed to the milling drum 118. That end portion of each spindle 106 which is distant from the respective milling tool 148 carries a pinion 130 which corresponds to the pinion 37 shown in FIG. 3, and each spindle comprises a tip or head 131 which projects beyond the respective pinion 130 and which constitutes a motion transmitting follower adapted to track the face of a fixed cam here shown as a guide rail 132. Each spindle 106 constitutes with the respective tool 148 a milling unit, and it will be noted that these milling units surround the gear 119 and rotate with the milling drum 118 so that the gear 119 drives the pinions 130 and rotates the milling tools.

The means for biasing the heads 131 into engagement with the cam 132 (i.e., in a direction away from the respective sleeves 107) comprises a series of helically convoluted expansion springs 133 whose ends bear against the respective pinions 130 and against stop washers 134 which are associated with the respective spindles 106 and which are carried by a support on which the bushings 129 are mounted. In other words, the washers 134 do not participate in axial movements of the spindles 106.

The cam 132 is mounted downstream of the cutting device 117 and causes the milling tools 148 to penetrate into and to form substantially conical recesses in the right-hand end faces of the fillers 4, as viewed in FIGS. 10 and 11. This cam cooperates with a second stationary cam 135 which also assumes the form of a guide rail and which serves a dual purpose of preventing axial displacements of fillers 4 at the time the right-hand end portions of the fillers are being formed with recesses under the action of revolving milling tools 148, and of thereupon permitting controlled axial displacements of fillers 4 in a direction to permit expulsion of recessed end portions from the respective sleeves 107 before the fillers reach the transfer drum 123.

The cam 135 carries the frame of a soft rubber roller 136 which is adjacent to the central portion of the periphery of the drum 118. This roller is located upstream of the transfer drum 123, and the latter is provided with axially parallel peripheral pockets 137 which receive recessed fillers 4 from the pockets 126 and wherein the fillers are retained by suction, by means of shields or in any other suitable manner as is well known from the art of cigarette making machines.

The counter pressing drum 121 is provided with specially configurated axially parallel peripheral holders or pockets 139 which cooperate with the pockets 138 to perform the function of the jaws 13, 14 shown in FIGS. 4 and 5 by deforming recessed end portions of the fillers 4 in a manner to be described in connection with FIGS. 13 to 18. The heating means 122 is located downstream of the drum 121 and is adjacent to the path of deformed end portions of the fillers 4 so as to heat such end portions and to expel therefrom some moisture which the fillers take up while advancing along the spray nozzle 124.

The apparatus of FIGS. 10 to 12 operates as follows:

The distributor 108 showers tobacco T onto the conveyor 109 to form a stream S which is transferred into the groove 110a of the disk 110 and toward the inlet finger device 111. The latter compresses the tobacco stream S to a predetermined cross section and advances the stream S onto the feeding band 113. The finger 112 cooperates with the band 113 to form a continuous filler rod U which is simultaneously wrapped into the strip 115 and which is advanced toward the cutting or subdividing device 117. This device subdivides the rod U during the continuous formation thereof into individual fillers 4 and such fillers are forcefully projected into the pockets 126 so that their right-hand end portions (as viewed in FIGS. 10 and 11) penetrate into the respective sleeves 107.

Such movements of the fillers are caused by the feeding band 113. When a filler 4 penetrates into the respective sleeve 107, its axial movement is terminated by friction and the drum 118 thereupon moves the filler in the direction indicated in FIGS. 11 and 12 by the arrow 118' so that the right-hand end portion of the filler is formed with a recess in the following manner:

The spindle 106 which is aligned with the filler just ejected by the feeding band 113 advances the respective milling tool 148 in a direction to the left, as viewed in FIG. 11, because its head 131 slides along the left-hand face of the cam 132 and the revolving tool 148 forms a recess in the end face of that end portion of the filler which is received in the associated sleeve 107. The spindle is moved against the bias of the associated spring 133 and its tool 148 presses the left-hand end portion of the filler against the right-hand face of the cam 135 so that the right-hand end portion of the filler remains in the sleeve 107. The tool 148 is driven by the pinion 130 of the respective spindle 106 because this pinion orbits about and meshes with the gear 119.

When a milling tool 148 has penetrated into the right-hand end face of the aligned filler 4 and has formed therein a recess of requisite depth, the recessed end face of the filler is engaged by the left-hand end face 140 of the associated spindle 106 and this end face 140 then expels the filler from the respective sleeve 107. The lower portion of the cam 135 (as viewed in FIG. 11) is bent in a direction away from the gear 119 so as to provide room for fillers whose right-hand end portions were expelled from the aligned sleeves 107. During such axial displacement in a direction away from the gear 119, the fillers 4 are engaged by the soft roller 136. When a filler is expelled from the aligned sleeve 107, the corresponding spindle 106 reaches a lobe 132a of the cam 132 and is then free to follow the bias of the respective spring 133 to withdraw the tool 148 from the right-hand end portion of the aligned filler. Thus, the filler is now supported only by the milling drum 118 and is free to advance with this drum toward the transfer drum 123. Immediately after the tools 148 are withdrawn from the aligned fillers, such fillers are held against axial movement by the roller 136 and are thereupon engaged by a suitable shield or are subjected to suction so as to remain in the pockets 126 while moving toward the transfer station occupied by the drum 123.

While travelling with the drum 123, the fillers are retained in respective pockets 137 by suction or by means of shields, and are thereupon transferred into pockets 138 of the molding drum 120. Before reaching the molding drum 120, the recessed end portion of each filler is wetted by the nozzle 124 which is adjacent to the periphery of the drum 123. During transfer onto the drum 120, the fillers 4 are pressed into the pockets 138 so that their recessed end portions are partially deformed by being compressed inwardly because the right-hand end portions of the pockets 138 (as viewed in FIG. 11) are of reduced cross section and taper in a direction toward the right-hand end face of the drum 120. Such partially deformed fillers are then subjected to the compressing action of the counter pressing roller or drum 121 whose pockets 139 cooperate with the pockets 138 to form elongated mold cavities for the fillers and to complete the deformation of such fillers at the time the fillers reach the heating means 122. The configuration of the pockets 139 is identical with that of the pockets 138. It will be readily understood that the heating means may extend along a substantial length of the periphery of the molding drum 120 if it is necessary to subject the deformed end portions of fillers 4 to longer-lasting heating action. The heating means 122 performs an initial drying to remove a predetermined amount of moisture from the fillers before they are discharged from the pockets 138 at a point upstream of the transfer drum 123, for example, by means of a second transfer drum in a manner as shown in FIG. 1.

The manner in which the apparatus of FIGS. 10 to 12 drills and thereupon deforms the end portions of fillers 4 will be more readily understood by referring to FIGS. 13 to 18 which illustrate a single filler and only such component parts of the apparatus which are necessary for full understanding of my method.

Figure 13:
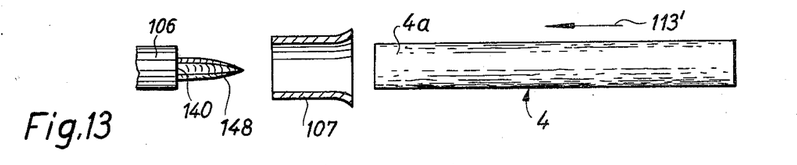
FIG. 13 is an enlarged partly elevational and partly sectional view through certain elements of the apparatus shown in FIGS. 10 to 12, showing the manner in which the end portion of a newly formed cigar or cigarillo filler may be introduced into a clamping sleeve prior to being engaged by the tool of a milling unit.

In FIG. 13, the filler 4 is assumed to move in the direction indicated by the arrow 113' because it was ejected by the rod U (see FIG. 10) past the subdividing device 117 and into the aligned pocket 126 of the milling drum 118.

Figure 14:
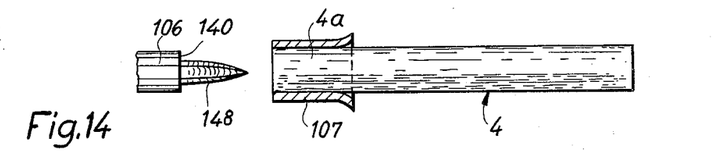
FIG. 14 illustrates the next stage of the operation when the end portion of the filler is received in the clamping sleeve.
Figure 15:
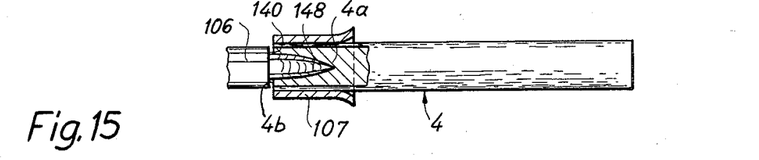
FIG. 15 illustrates the filler in the position of FIG. 14 and the manner in which the milling tool forms a recess in that end face of the filler which is received in the clamping sleeve.
Figure 16:
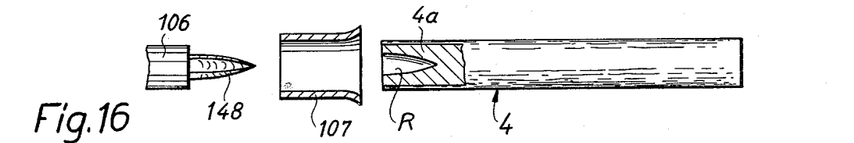
FIG. 16 shows the filler upon withdrawal from the sleeve.
Figure 17:
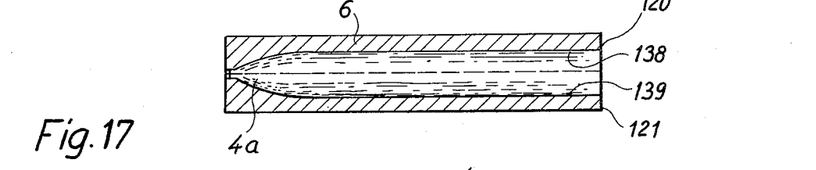
FIG. 17 is a longitudinal section through a portion of a molding drum which forms part of the apparatus shown in FIGS. 10 to 12 and through a portion of a cooperating counter pressing drum, these drums being provided with peripheral pockets which define mold cavities for the fillers and which are adapted to deform the recessed end portions of the fillers.
Figure 18:
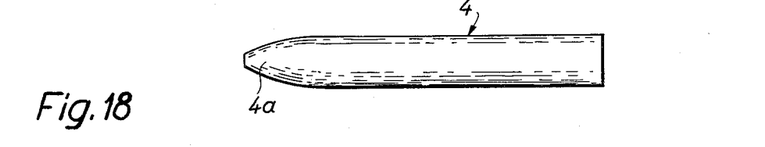
FIG. 18 is an elevational view of a cigar or cigarillo filler as it appears upon removal from the mold cavity.

In FIG. 14, the filler 4 has been arrested by friction in a position in which its end portion 4a is received in the clamping sleeve 107 and the spindle 106 is about to move its tool 148 into the interior of the sleeve. The tool 148 thereupon forms a recess R in a manner as shown in FIG. 15, and the formation of this recess is completed when the end face 140 of the spindle 106 comes into abutment with the adjacent end face 4b of the end portion 4a. The end face 140 then expels the filler from the sleeve 107 because its head 131 (see FIG. 11) is caused to travel along the cam 132 so that the recessed filler (FIG. 16) may be transferred into the pocket 138 of the molding drum 120 (FIG. 17). This drum cooperates with the counter pressing drum 121 whose pocket 139 is mirror symmetrical to the pocket 138, and the drums 120, 121 cause the end portion 4a to assume a conical shape which is shown in FIGS. 17 and 18. It will be noted that the pockets 138, 139 together form a mold cavity whose outlines correspond to the outlines of the finished product. If desired, the apparatus of FIGS. 10 to 12 may comprise a rotary cutter corresponding to the cutter 79 shown in FIG. 4 in order to remove from the end portion 4a excess tobacco which projects from the mold cavity. It will be noted that the portion of the drum 121 surrounding the pocket 139 constitutes a molding unit which is analogous to one of the molding units 12 or 12' of the apparatus shown in FIG. 2. In other words, the apparatus of FIGS. 10 to 12 is comparable to the apparatus of FIG. 2 minus the units 5, 12 or 5', 12'.

Tobacco removed by the milling tools 148 is evacuated from the casing 125 in a manner as described in connection with FIG. 1, i.e., the internal space of this casing may be maintained at subatmospheric pressure. Fillers removed from the pockets 138 are rolled into wrapping or cover sheets in a manner not shown in the drawings.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier; and at least one molding unit for compressing the end portions of fillers while the fillers are received in the holder means of said second carrier.

2. An apparatus for treating end portions of elongated cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool and means for reciprocating said milling tool in directions parallel with said first mentioned axis for milling recesses in the end portions of fillers while the fillers are received in the holder means of said first carrier; and at least one molding unit comprising a plurality of jaws and means for reciprocating said jaws in directions substantially radially with respect to the longitudinal extensions of the fillers so that the jaws compress the end portions of fillers while the fillers are received in the holder means of said second carrier.

3. An apparatus for treating end portions of elongated cigar and cigarillo fillers, comprising a first rotary carrier having a plurality of peripherally arranged filler-receiving holder means parallel with the axis of rotation of said carrier; means for consecutively feeding fillers into said holder means; a second rotary carrier having a plurality of peripherally arranged filler receiving holders means parallel with the axis of rotation of said second carrier; means for rotating said carriers; means located downstream of said feeding means for consecutively transferring fillers from the holder means of said first carrier into the holder means of said second carrier; at least one pair of milling units each comprising a tool and means for reciprocating said tool in directions parallel with said first mentioned axis for simultaneously removing tobacco from and for thereby milling recesses in both end portions of fillers while the fillers are received in the holder means of said first carrier; and at least one pair of molding units for simultaneously compressing both end portions of fillers while the fillers are received in the holder means of said second carrier.

4. An apparatus for treating end portions of elongated cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier into the holder means of said second carrier; a plurality of pairwise arranged milling units, one pair for each holder means of said first carrier, said milling units comprising rotary milling tools mounted on said first carrier and means for reciprocating said tools in directions parallel with said first mentioned axis for simultaneously removing tobacco from and for thereby milling recesses in both end portions of the respective fillers; and a plurality of pairwise arranged molding units, one pair for each holder means of said second carrier, said molding units being rotatable with said second carrier and having compressing jaws and means for reciprocating said jaws in directions substantially radially with respect to the longitudinal extensions of the fillers for simultaneously compressing both end portions of the respective fillers.

5. An apparatus for treating end portions of elongated cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier into the holder means of said second carrier; a plurality of pairwise arranged milling units, one pair for each holder means of said first carrier, said milling units comprising rotary milling tools supported by and rotatable with said first carrier and each thereof comprising means for reciprocating the respective tool in directions parallel with said first mentioned axis for simultaneously removing tobacco from and for thereby milling recesses in both end portions of the respective fillers; and a plurality of pairwise arranged molding units, one pair of each holder means of said second carrier, said molding units being supported by and being rotatable with said second carrier and having compressing jaws and means for reciprocating said jaws in directions substantially radially with respect to the longitudinal extensions of the fillers for simultaneously compressing both end portions of the respective fillers.

6. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool; means for rotating said milling tool; means for reciprocating said milling tool in directions parallel with said first mentioned axis so that the milling tool may remove tobacco from to form recesses in the end portions of fillers while the fillers are received in the holder means of said first carrier; and at least one molding unit for compressing the end portions of fillers while the fillers are received in the holder means of said second carrier.

7. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; clamping elements provided on said first carrier for gripping the end portions of fillers while the fillers are received in the holder means of said first carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier and while the respective end portion of a filler engaged by said tool is gripped by said clamping elements; and at least one molding unit for compressing the end portions of fillers while the fillers are received in the holder means of said second carrier.

8. An apparatus for treating end portions of cigar and cigarillo fillers, comprising a first rotary carrier having a plurality of filler-receiving peripheral holder means parallel with the axis of rotation of said carrier; means for consecutively feeding fillers into said holder means; a second rotary carrier having a plurality of filler-receiving peripheral holder means parallel with the axis of rotation of said second carrier; means for rotating said carriers at identical peripheral speeds; first transfer means located downstream of said feeding means for consecutively transferring fillers from the holder means of said first carrier to the holder means of said second carrier; second transfer means located downstream of said first transfer means for consecutively receiving fillers from the holder means of said second carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier; and at least one molding unit for compressing the end portions of fillers while the fillers are received in the holder means of said second carrier.

9. An apparatus as set forth in claim 8, wherein the distance between said first and second transfer means exceeds the distance between said feeding means and said first transfer means.

10. An apparatus as set forth in claim 9, wherein each of said carriers is a drum and the diameter of said second carrier exceeds substantially the diameter of said first carrier.

11. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier; at least one molding unit for compressing the end portions of fillers while the fillers are received in the holder means of said second carrier; casing means surrounding said first and second carrier; and means connected with said casing means for creating partial vacuum in and for thereby withdrawing tobacco particles and other impurities from said casing means.

12. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier; and at least one molding unit for compressing the end portions of fillers while the fillers are received in the holder means of said second carrier, said molding unit comprising a plurality of filler-engaging jaws and means for heating said jaws.

13. An apparatus for treating end portions of cigar and cigarillo fillers, comprising a first rotary carrier having a plurality of filler-receiving holder means parallel with the axis of rotation of said carrier; means for consecutively feeding fillers into said holder means; a second rotary carrier having a plurality of filler-receiving holder means parallel with the axis of rotation of said second carrier; means for rotating said carriers; means located downstream of said feeding means for consecutively transferring fillers from the holder means of said first carrier to the holder means of said second carrier; at least one milling unit comprising a milling tool and means for reciprocating said tool in directions parallel with said first mentioned axis for removing tobacco from and for thereby milling recesses in the end portions of fillers while the fillers are received in the holder means of said first carrier; means for wetting the end portions of the fillers while the fillers are received in the holder means of said second carrier; and at least one molding unit located downstream of said wetting means for compressing the end portions of fillers while the fillers are received in the holder means of said second carrier.

14. An apparatus for treating end portions of elongated cigar and cigarillo fillers, comprising a rotary milling drum having a plurality of filler-receiving peripheral holder means parallel with the axis of rotation of said drum; means for consecutively feeding fillers into said holder means; a rotary molding drum having a plurality of filler-receiving peripheral holder means parallel with the axis of rotation of said molding drum, each of said last mentioned holder means comprising a pair of spaced aligned pockets and at least one block located between the respective pair of pockets and reciprocable substantially radially with respect to the axis of said molding drum so as to selectively move the fillers radially inwardly or outwardly in the respective pockets; means for rotating said drums; means located downstream of said feeding means for consecutively transferring fillers from the holder means of said milling drum into the hollder means of said molding drum; at least one milling unit comprising a milling tool and means for reciprocating said tool in directions parallel with said first mentioned axis for removing tobacco from and for thereby milling recesses in the end portions of fillers while the fillers are received in the holder means of said milling drum; at least one molding unit comprising at least two filler-engaging jaws reciprocable substantially radially with respect to the longitudinal extensions of the fillers for compressing the end portions of fillers while the fillers are received in the holder means of said molding drum; means for reciprocating said jaws; and means for reciprocating said blocks in synchronism with reciprocatory movements of said jaws.

15. An apparatus for treating end portions of elongated cigar and cigarillo fillers, comprising a rotary milling drum having a plurality of filler-receiving peripheral holder means parallel with the axis of rotation of said drum; means for consecutively feeding fillers into said holder means; a rotary molding drum having a plurality of filler-receiving peripheral holder means parallel with the axis of rotation of said molding drum; means for rotating said drums; means located downstream of said feeding means for consecutively transferring fillers from the holder means of said milling drum into the holder means of said molding drum; at least one milling unit comprising a milling tool and means for reciprocating said tool in directions parallel with said first mentioned axis for removing tobacco from and for thereby milling recesses in the end portions of fillers while the fillers are received in the holder means of said milling drum; at least one molding unit comprising an intermediate jaw reciprocable substantially radially with respect to the axis of said molding drum into and out of compressing engagement with the end portions of the fillers, and a pair of outer jaws cooperating with said intermediate jaw and reciprocable substantially tangentially with respect to said molding drum into and out of compressing engagement with the end portions of the fillers together with said intermediate jaw while the fillers are received in the holding means of said molding drum; and means for reciprocating said jaws into and out of engagement with the end portions of the fillers.

16. An apparatus as set forth in claim 15, wherein said jaws define between themselves a first and a second mold cavity one of which receives the tip of the end portion of a filler and the other of which receives the remainder of the respective end portion.

17. An apparatus as set forth in claim 16, wherein said second mold cavity is of substantially conical shape and flares outwardly in a direction away from said first mold cavity.

18. An apparatus as set forth in claim 17, further comprising cutter means for separating the tips from the remainders of end portions of the consecutive fillers subsequent to molding of such end portions by said jaws.

19. An apparatus as set forth in claim 18, wherein said cutter means is a rotary disc cutter located adjacent to said molding drum for separating the tips from the remainder of the end portions of the fillers while such end portions are subjected to compressive action of said jaws.

20. An apparatus for treating cigar and cigarillo fillers, comprising a first rotary carrier including a drive shaft and a pair of axially adjustable disk-shaped elements mounted on said shaft, said elements having aligned filler-receiving peripheral pockets parallel with the axis of said shaft; means for consecutively feeding fillers into the aligned pockets of said elements; a second rotary carrier including a second drive shaft and a pair of substantially disk-shaped axially adjustable second elements mounted on said second shaft, said second elements having aligned filler-receiving peripheral pockets parallel with the axis of said second shaft; means for rotating said carriers; means located downstream of said feeding means for consecutively transferring fillers from aligned pockets of said first mentioned elements into aligned pockets of said second elements; at least one milling unit comprising a milling tool and means for reciprocating said tool in directions parallel with the axis of said first mentioned shaft for removing tobacco from and for thereby milling recesses in the end portions of fillers while the fillers are received in aligned pockets of said first mentioned elements; and at least one molding unit for compressing the end portions of fillers while the fillers are received in aligned pockets of said second elements.

21. An apparatus as set forth in claim 20, comprising a milling unit for each of said first mentioned pockets and a molding unit for each of said last mentioned pockets, said units rotatable and axially adjustable with the respective elements.

22. An apparatus as set forth in claim 21, wherein said milling units are adjacent to such faces of said first mentioned elements which are turned away from each other.

23. An apparatus as set forth in claim 21, wherein said molding units are adjacent to such faces of said second elements which are turned away from each other.

24. An apparatus for treating end portions of cigar and cigarillo fillers, comprising a first rotary carrier having a plurality of filler-receiving holder means at least nearly parallel with the axis of rotation of said carrier; means for consecutively feeding fillers into said holder means; a second rotary carrier having a plurality of filler-receiving holder means at least nearly parallel with the axis of rotation of said second carrier; means for rotating said carriers; means located downstream of said feeding means for consecutively transferring fillers from the holder means of said first carrier to the holder means of said second carrier; means comprising at least one milling tool for removing tobacco from and for thereby milling recesses in the end portions of fillers while the fillers are received in the holder means of said first carrier; and means for compressing the end portions of fillers while the fillers are received in the holder means of said second carrier.

25. An apparatus for treating end portions of cigar and cigarillo fillers, comprising a first rotary carrier having a plurality of filler-receiving holder means at least nearly parallel with the axis of rotation of said carrier; means for consecutively feeding fillers into said holder means; a second rotary carrier having a plurality of filler-receiving holder means at least nearly parallel with the axis of rotation of said second carrier; means for rotating said carriers; means located downstream of said feeding means for consecutively transferring fillers from the holder means of said first carrier to the holder means of said second carrier; means comprising at least one milling tool for removing tobacco from an for thereby milling recesses in the end portions of fillers while the fillers are received in the holder means of said first carrier; means for compressing the end portions of fillers while the fillers are received in the holder means of said second carrier; means located downstream of said milling tool but upstream of said molding means for wetting the end portions of the fillers; and means located downstream of said compressing means for heating the end portions of the fillers.

26. An apparatus for making and for thereupon treating end portions of cigar and cigarillo fillers, comprising means for continuously forming an elongated tobacco-containing filler rod; means for subdividing the filler rod during the continuous formation thereof into fillers of desired length with each filler having an end face; a first rotary carrier having a plurality of filler-receiving holder means at least nearly parallel with the axis of rotation of said carrier; means for consecutively feeding fillers into said holder means; a second rotary carrier having a plurality of filler-receiving holder means at least nearly parallel with the axis of rotation of said second carrier; means for rotating said carriers; means located downstream of said feeding means for consecutively transferring fillers from the holder means of said first carrier to the holder means of said second carrier; means comprising at least one milling tool for removing tobacco from and for thereby milling recesses in the end faces of fillers while the fillers are received in the holder means of said first carrier; and means for compressing such end portions of the fillers which surround the respective recesses while the fillers are received in the holder means of said second carrier so as to impart to such end portions a substantially conical shape.

27. An apparatus for making and for thereupon treating end portions of cigar and cigarillo fillers, comprising means for continuously forming an elongated tobacco-containing filler rod; means for subdividing the filler rod during the continuous formation thereof into fillers of desired length with each filler having an end face; a first rotary carrier having a plurality of filler-receiving holder means at least nearly parallel with the axis of rotation of said carrier; means for consecutively feeding fillers into said holder means; a second rotary carrier having a plurality of filler-receiving holder means at least nearly parallel with the axis of rotation of said second carrier, each of said last mentioned holder means shaped as a pocket having an end portion of reduced cross-sectional area adapted to partially accommodate the end portion of a filler; means for rotating said carriers; means located downstream of said feeding means for consecutively transferring fillers from the holder means of said first carrier to the holder means of said second carrier; means comprising at least one milling tool for removing tobacco from and for thereby milling recesses in the end faces of fillers while the fillers are received in the holder means of said first carrier; and means for compressing such end portions of the fillers which surround the respective recesses while the fillers are received in the holder means of said second carrier so as to impart to such end portions a substantially conical shape, said compressing means comprising a rotary counter pressing roller having peripheral pockets with end portions of reduced cross-sectional area each adapted to partially accommodate the end portion of a filler received in one of said first mentioned pockets, said first mentioned pockets and said last mentioned pockets defining elongated mold cavities for the fillers and the end portions of the fillers being compressed while being forced into the end portions of the respective pockets when said roller and said second carrier rotate.

28. An apparatus for making and for thereupon treating end portions of cigar and cigarillo fillers, comprising; means for continuously forming an elongated tobacco-containing filler rod; means for subdividing the filler rod during the continuous formation thereof into fillers of desired length with each filler having an end face; a first rotary carrier having a plurality of filler-receiving holder means at least nearly parallel with the axis of rotation of said carrier; means for consecutively feeding fillers into said holder means; a second rotary carrier having a plurality of filler-receiving holder means at least nearly parallel with the axis of rotation of said second carrier; means for rotating said carriers; means located downstream of said feeding means for consecutively transferring fillers from the holder means of said first carrier to the holder means of said second carrier; means comprising a rotary milling tool for each of said first mentioned holder means, said milling tools being aligned with the respective holder means and being rotatable with said first carrier; means for reciprocating said tools toward and away from the fillers received in the respective holder means so that said tools remove tobacco from and thereby form recesses in the end faces of the respective fillers; means for rotating said tools; and means for compressing such end portions of the fillers which surround the respective recesses while the fillers are received in the holder means of said second carrier so as to impart to such end portions a substantially conical shape.

29. An apparatus as set forth in claim 28, wherein the means for rotating said tools comprises a fixed gear coaxial with said first carrier, a spindle supportingly connected with each of said tools, and a pinion mounted on each spindle and meshing with said gear to rotate the respective spindle and the respective tool while the tools rotate with said first carrier.

30. In an apparatus for treating end portions of cigar and cigarillo fillers, in combination, carrier means comprising a plurality of filler-receiving holder means and arranged to advance the fillers received in said holder means in arcuate paths so that the direction of movement of the fillers is substantially perpendicular to the longitudinal extensions of the fillers; milling means comprising at least one rotary milling tool arranged to remove tobacco from and to thereby form recesses in the end portions of fillers while the fillers advance in one of said paths; and compressing means arranged to compress the thus milled end portions of the fillers while the fillers advance in another of said paths.

31. In an apparatus for treating end portions of elongated cigar and cigarillo fillers, in combination, a first rotary carrier having a plurality of filler-receiving holder means and arranged to advance the fillers received in said holder means in a direction which is substantially perpendicular to the longitudinal extensions of the fillers; milling means comprising at least one rotary milling tool arranged to remove tobacco from and to thereby form recesses in the end portions of fillers while the fillers are received in said holder means; a second rotary carrier having a plurality of filler-receiving holder means arranged to receive fillers consecutively from the holder means of said first carrier and to advance the fillers in a direction which is substantially perpendicular to the longitudinal extensions of the fillers; and compressing means arranged to compress the end portions of fillers while the fillers are received in the holder means of said second carrier.

References Cited by the Examiner

UNITED STATES PATENTS

| | | | |
|---|---|---|---|
| 500,020 | 6/93 | Miller | 131—32 |
| 739,278 | 9/03 | Anderson | 131—83 |
| 863,503 | 8/07 | Bright et al. | 131—83 X |
| 1,079,581 | 11/13 | Preissler et al. | |
| 1,245,012 | 10/17 | Norquest | 131—91 X |
| 1,543,876 | 6/25 | Rundell | 131—87 X |
| 1,948,626 | 2/34 | Patterson et al. | |
| 1,964,101 | 6/34 | Wheeler | 131—83 X |
| 2,005,280 | 6/35 | Von Segebaden | 131—87 |
| 2,023,370 | 12/35 | Lincoln | 131—83 |
| 2,075,055 | 3/37 | Prager | 131—254 |
| 2,349,320 | 5/44 | Wheeler | 131—83 |
| 2,367,911 | 1/45 | Wells | 131—59 |

FOREIGN PATENTS

| | | |
|---|---|---|
| 520,754 | 7/53 | Belgium. |
| 11,431 | 10/80 | Germany. |
| 1,501 | 1872 | Great Britain. |
| 138,614 | 6/20 | Great Britain. |

SAMUEL KOREN, *Primary Examiner.*